(12) United States Patent
Patterson (10) Patent No.: US 7,279,088 B2
(45) Date of Patent: Oct. 9, 2007

(54) CATALYTIC ELECTRODE, CELL, SYSTEM AND PROCESS FOR STORING HYDROGEN/DEUTERIUM

(76) Inventor: James A. Patterson, 2612 Tanglewood Dr., Sarasota, FL (US) 34239

( * ) Notice: Subject to any disclaimer, the term of this patent is extended or adjusted under 35 U.S.C. 154(b) by 219 days.

(21) Appl. No.: 11/260,855

(22) Filed: Oct. 27, 2005

(65) Prior Publication Data

US 2007/0095658 A1  May 3, 2007

(51) Int. Cl.
*C01B 6/02* (2006.01)
*C01B 6/24* (2006.01)
*C01B 3/56* (2006.01)
*C25B 1/00* (2006.01)
*C25B 11/02* (2006.01)

(52) U.S. Cl. ............... 205/799; 204/157.3; 34/416; 376/144; 206/0.7; 422/186.06; 423/644

(58) Field of Classification Search ............. 34/416; 376/144
See application file for complete search history.

(56) References Cited

U.S. PATENT DOCUMENTS

| | | | |
|---|---|---|---|
| 2,915,496 A | 12/1959 | Swart et al. | |
| 3,577,324 A | 5/1971 | Patterson | |
| 3,632,496 A * | 1/1972 | Patterson et al. | ........... 204/249 |
| 3,654,098 A | 4/1972 | Backhurst et al. | |
| 3,965,039 A | 6/1976 | Chaplits et al. | |
| 3,991,225 A | 11/1976 | Blouin | |
| 4,130,506 A | 12/1978 | Collier et al. | |
| 4,179,402 A | 12/1979 | Kim et al. | |
| 4,196,525 A * | 4/1980 | Ebdon et al. | ........... 34/416 |
| 4,225,320 A * | 9/1980 | Gell | ........... 48/191 |
| 4,243,728 A | 1/1981 | Sato et al. | |
| 4,306,085 A | 12/1981 | Kim et al. | |
| 4,316,786 A | 2/1982 | Yu et al. | |
| 4,383,606 A * | 5/1983 | Hunter | ........... 206/0.7 |
| 4,490,348 A * | 12/1984 | Mizuno et al. | ........... 423/645 |

(Continued)

OTHER PUBLICATIONS

NATURE, Apr. 28, 2005 vol. 434, Issue No. 7037 "Crystal Fusion Generates Neutrons on the Desktop", Mark Peplow & "Warm Fusion" by Michael J. Saltmarsh.

(Continued)

*Primary Examiner*—Harry D Wilkins, III
(74) *Attorney, Agent, or Firm*—Charles J. Prescott (57) ABSTRACT

A catalytic electrode, cell, system and process for absorbing and storing hydrogen ($H_2$) and deuterium ($D_2$) from the gaseous to the solid ionic form. The cell includes a non-conductive sealed housing and a conductive catalytic electrode positioned within the housing which absorbs $H_2$ and/or $D_2$ gas and stores it in a solid ionic form. These electrodes are formed of palladium (Pd), titanium (Ti), or zirconium (Zr). Each end of the electrode is plated with a layer of gold and encapsulated with a curable resin to form a confinement zone for $H\pm$ and/or $D\pm$ storage. The process includes connecting an external d.c. electric power source to each confinement zone during $H_2$ and/or $D_2$ gas loading of the electrode to cause a plasma-like reaction to occur which drives the $H_2$ and/or $D_2$ in the electrode to each encapsulated confinement to effect long-term storage of the ion form $H\pm$ and $D\pm$ in a solid form for later use.

18 Claims, 7 Drawing Sheets

U.S. PATENT DOCUMENTS

| | | | |
|---|---|---|---|
| 4,564,532 A | 1/1986 | Henderson | |
| 4,624,865 A | 11/1986 | Gindrup et al. | |
| 4,853,135 A | 8/1989 | Oecki et al. | |
| 4,943,355 A | 7/1990 | Patterson | |
| 5,036,031 A | 7/1991 | Patterson | |
| 5,318,675 A * | 6/1994 | Patterson | 205/628 |
| 2005/0219787 A1* | 10/2005 | Stevenson et al. | 361/302 |

OTHER PUBLICATIONS

"FraP2.11 Proton Plasma in Host Metals for Low Energy Nuclear Transmutations", Heinrich Hora, Jak C. Kelly, James A. Patterson & George Miley—Annual Meeting of the Plasma . . . Physics Division of the American Physical Society, Pittsburgh, PA, Nov. 1997.

* cited by examiner

CATALYTIC ELECTRODE, CELL, SYSTEM AND PROCESS FOR STORING HYDROGEN/DEUTERIUM

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to catalytic systems and fuel cells, and more particularly to a hydrogen/palladium-type catalytic electrode cell system and process for the storing of hydrogen and deuterium in the solid form.

2. Description of Related Art

Catalytic devices and systems for storing hydrogen and deuterium from a gaseous state into a solid form appear to be well known. In my prior U.S. Pat. Nos. 4,943,355 and 5,036,031 I disclose catalytic particles and methods of manufacture for absorbing and storing high amounts of hydrogen for later use as a catalyst.

Basic Chemistry

The basic chemistry of the formulation of one form of a hydrogen/palladium fuel cell is as follows:

$$H_2(gas)Pd \rightarrow 2\ Pd\ H(solid)PdH^+ + Pd\ H^-(\text{an ionic conversion}) \quad 1.$$

$$D_2(gas)2Pd \rightarrow 2\ PdD(solid)PdD^+ + Pd\ D^-(\text{an ionic conversion}) \quad 2.$$

where Pd $H^+$ and Pd $H^-$ (likewise for Pd $D^+$ and Pd $D^-$)

3. The hydrogen ions are internally bound as a cation (Pd $H^+$) and anion (Pd $H^-$) where the palladium base is a Zwitter ion.

The solid metal matrix palladium (Pd) is similar in ion exchange characteristics to an ion exchange resin from polymeric spherical mobile sulfonated styrene-divinyl benzene where the hydrogen ion ($H^+$) is exchanged in the resin as:

$$RSO_3^-H^+ \rightarrow RSO_3^- + H^+ \quad 4.$$

The cross linking of the polystyrene by the divinyl benzene controls the swelling of the ionic bound species. The movement of the $H^+$ ion internal to the resin matrix (hydrated) is similar to that of a row of balls in linear contact with one another. If one of the terminal balls imparts a force to the balls, the other end will move This is one of the possible mechanisms for ionic motion in the solid resin matrix. One of the other effects of ion loading of the resin matrix is a tendency to swell due to the hydration (water molecules) associated with the ion i.e. the cross-linking of the divinyl benzene restrains this hydration expansion.

The higher the cross-linking, the less the hydrational expansion. The resin matrix can support an anion ($H^+$) and a cation ($CSO_3^-$). This dual characteristic is a Zwitter ion.

Now the ion exchange resin has been briefly described, the Pd material will be shown to be like in its reaction to a hydride (or Deuteride).

Pd, in the equations (1) (2) & (3) with hydrogen ($H_2$) and deuterium ($D_2$) gas in equations (1) and (2) has an internal movement toward the positive and negative electrodes. Incorporating the $H^{+-}$ or $D^{+-}$ into the Pd matrix will cause the Pd matrix to expand. When there are zones in the Pd metal matrix that can absorb more $H^{+-}$ or $D^{+-}$ they will expand to the point of rupture or cracking.

These loci of matrix (Pd) expansion are where the highest concentration of Pd $H^{+-}$ and/or Pd $D^{+-}$ occur and, in all probability, the location of nuclear fusion if the Pd matrix can withstand the hydride or deuteride expansion. If the matrix does not remain intact, a rupture or crack will form and $$2H^{+-} \text{ or } 2D^{+-} \rightarrow H_2 \text{ or } D_2$$

i.e., leak off the power source due to these ruptures or cracks

Plasma

A solid plasma-like product is produced from palladium (Pd) solid and hydrogen ($H_2$) or deuterium (d) gas. This product is referred to herein as a solid plasma and may be expressed as follows:

$$Pd\ D_{1.0} \rightarrow Pd\ D^+_{0.5} \ldots Pd\ D^-_{0.5} \quad 6.$$

$$\text{Solid Plasma} = H^+ - H^- \text{ or } D^+ - D^- \text{ or } T^{-+}T^- \quad 7.$$

The well-known thermonuclear fusion is created by the creation of the ions.

$$D_2 \xrightarrow{\Delta H} D^- + D^+$$

These ions may be held in a magnetic vessel by confinement, referred to as Magnetic Confinement Fusion (MCF) as an example of Internal Confinement Fusion ICF.

TABLE I

Summary of Constants

1.0 g atom of $D_2$ gas = 22.5 1 mole
1.0 g atom = 2 × 2 = 4.0 g $D_2$ (1.0 mole)
1.0 g atom = 4 × $10^{23}$ atoms/mole
1.0 g onto of Pd = 106 g (1.0 mole)
density of Pd = 12.02 g/cc
1.0 mole of Pd = 106/12/cc = 8.82 cc = 1.0 mole Pd
1.0 mole of Pd Pd $D_{1.0}$ = 0.5 Mole of $D_2$
or gas equivalent of 11.25 L = 11,250 cc
and 9.9 cc as a solid in Pd, or
1278 to 1 gas to solid ratio, or
1278 cc of $D_2$ gas will condense to 1.0 cc of Pd $D_{1.0}$ Solid plasma (1.0) cc is the condensed plasma form of 1278 cc plasma in the gaseous form. MCF thermo-nuclear macro explosions by hot plasma are called Inertial Confinement Fusion or ICF. The Takemak reaction is the most well known ICF in an attempt to produce controlled nuclear fusion power. After about $30 billion dollars in R/D, the Takemak project has not been successful. Other gas or plasma programs are using magnetic field configurations of plasma confinement fusion or a magnetic mirror system (Takemak c) linear pinch. *Fundamentals of Plasma Physics*, J. A. Bittencourt-Springer, 3rd edition.

8. Low Temperature Nuclear Reactions

In the monthly journal, NATURE, a reactor for a neutron supply operates in the following equation:

$$_{+1}D^2 + _{+1}D^2 \rightarrow He^3 + N$$

See NATURE, 28 Apr. 2005, Seth Putterman et al. pp. 1057 1077 & 1115.

Physics Dept. Chem. Dept CNSL 4 of California.

Figure 7:
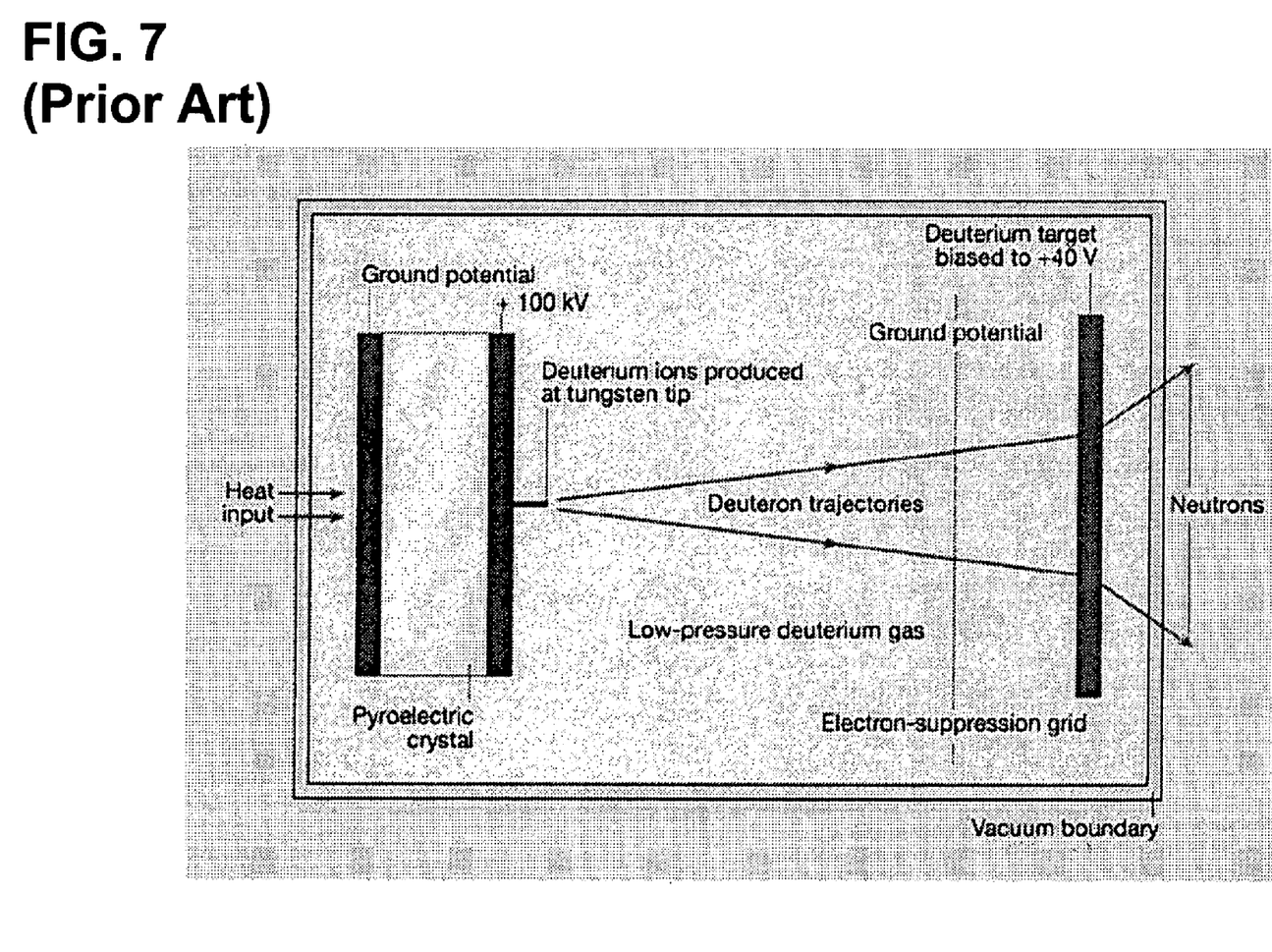
FIG. 7 is an apparatus for neutron generation.

Using a plasma induced from a pyroelectric crystal through a $D_2$ gas striking a Er $D_3$ Erbium deutride target emitting neutrons at a temperature of 12.4° C. provides a low temperature nuclear D-D reaction as shown in FIG. 7. (See Supra at pg. 1079). Referring to FIG. 7. Naranjo and colleagues' prior art apparatus for neutron generation is there shown at A. The chamber A is filled with deuterium gas at low pressure (0.7 pascals). As the crystal B is heated, the potential builds across the crystal. Deuterium ions (deuterons) are generated at the tungsten tip, and accelerated towards the target C. The electrons fall back to the crystal electrode. The ions strike the deuterium target ($ErD_3$), and some generate 2.5 MeV neutrons. Electrons knocked from the target surface are repelled by the suppression grid and fall back on to the target rather than being accelerated back to the crystal. This D-D nuclear reactor is also magnetically confined.

The present invention provides an improved catalytic electrode cell system and process for the uptake or absorption of hydrogen and/or deuterium gas after which a plasma reaction within the cell forces the $H_2$-$D_2$ to the encapsulated ends of the electrode where stored in solid form for later use as a catalytic component such as in a fuel cell environment.

BRIEF SUMMARY OF THE INVENTION

This invention is directed to a catalytic electrode, cell, system and process for absorbing and storing hydrogen ($H_2$) and deuterium ($D_2$) from the gaseous to the solid form. The cell includes a non-conductive housing defining a sealable interior volume and a conductive catalytic electrode positioned within the interior volume which absorbs $H_2$ and/or $D_2$ gas and stores it in a solid form. These electrodes are formed of palladium (Pd), titanium (Ti), or zirconium (Zr) and may be formed as a solid strip, a perforated strip, or preferably, a screen mesh. The screen mesh is preferably nickel/palladium plated. Each end of the electrode is preferably plated with a layer of gold which forms a barrier to hydride or deuteride ions and encapsulated with a curable resin to form a confinement zone for $H^{+-}$ and/or $D^{+-}$ storage. First and second gas chambers cooperatively act to introduce $H_2$ and/or $D_2$ gas into said interior volume for absorption by the electrode. The process includes connecting an external d.c. electric power source to each confinement zone during $H_2$ and/or $D_2$ gas loading of the electrode to cause a plasma-like reaction to occur which drives the $H^{+-}$ and/or $D^{+-}$ in and on the electrode to each encapsulated confinement zone to effect long-term storage of the $H^{+-}$ and/or $D^{+-}$ as a solid for later use.

It is therefore an object of this invention to provide an improved catalytic electrode for the absorption or uptake of deuterium and/or hydrogen gas and the processing of it through plasma reaction into a solid form stored at the ends of the electrode.

Yet another object of this invention is to provide a catalytic electrode which will store greater amounts of the fuel cell components of hydrogen and deuterium in their solid form.

Yet another object of this invention is to provide for the storage of deuterium and hydrogen in the solid form in a safe room temperature environment.

In accordance with these and other objects which will become apparent hereinafter, the instant invention will now be described with reference to the accompanying drawings.

DETAILED DESCRIPTION OF THE INVENTION

Figure 1:
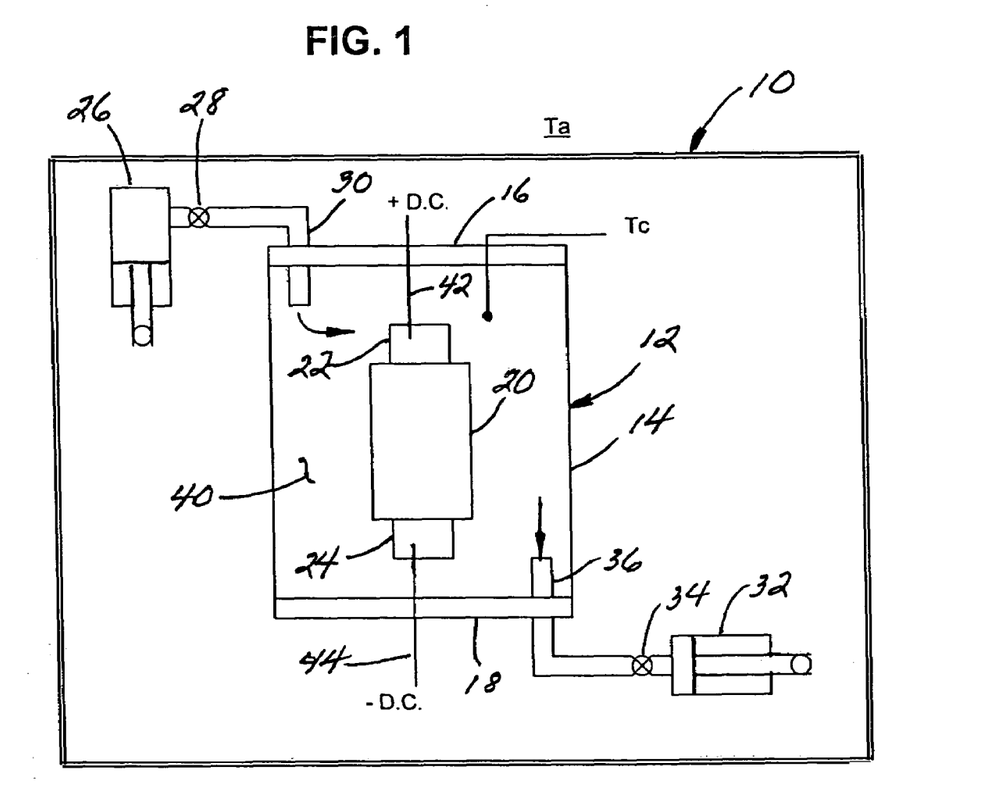
FIG. 1 is a simplified schematic view of the system of the present invention.
Figure 2:
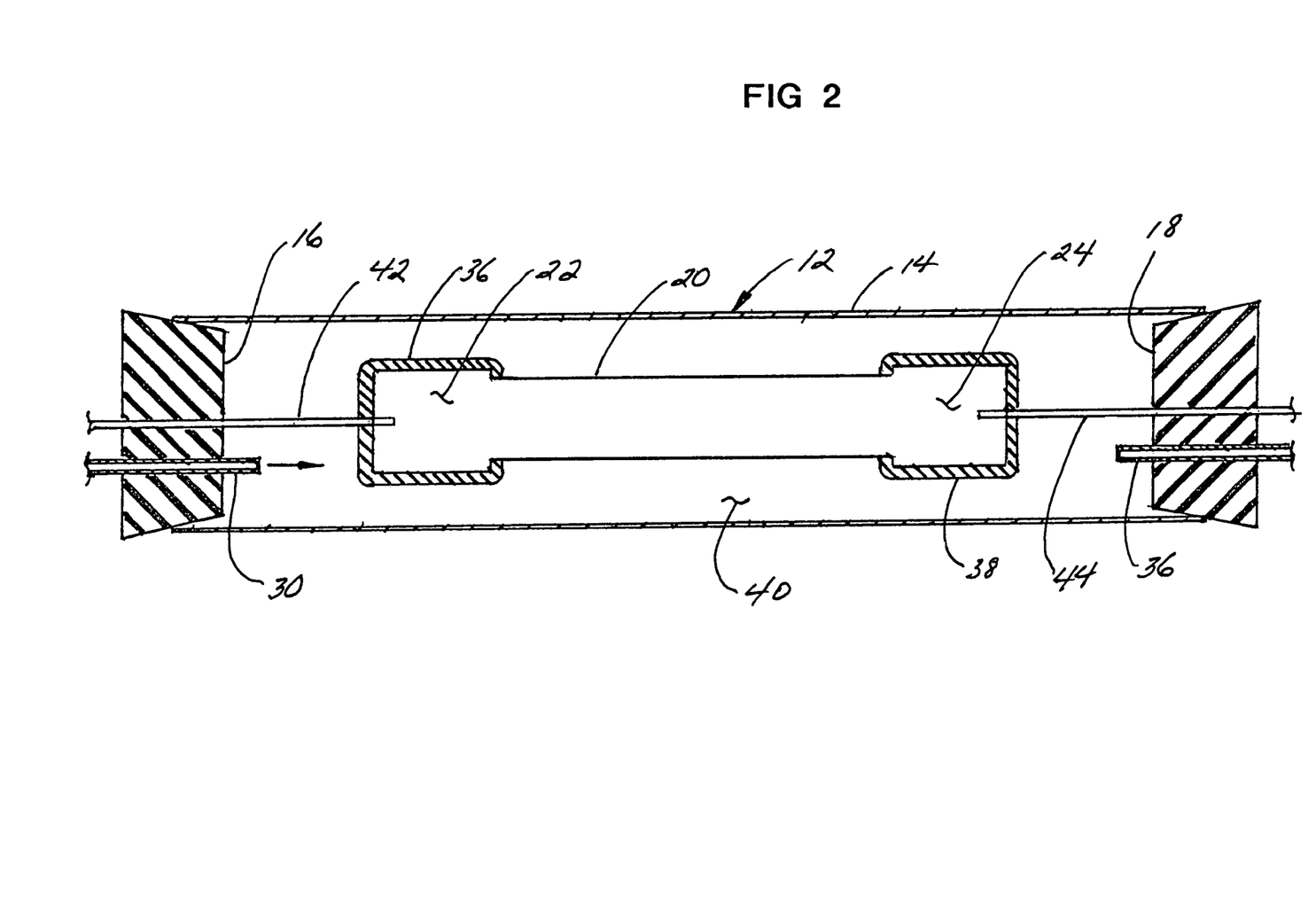
FIG. 2 is a sectional view of the catalytic cell of FIG. 1.

Referring now to the drawings, and firstly to FIGS. 1 and 2, the system of the invention is there shown generally at numeral 10 in FIG. 1 and includes a catalytic cell 12 having an elongated tubular non-conductive housing 14 preferably made of Pyrex glass and including non-conductive stoppers 16 and 18 sealably engaged into each end of the housing 14.

System 10 further includes a first and second gas chamber 26 and 34, respectively which, for experimental purposes, are in the form of a conventional syringe. Each of these gas chambers 26 and 32 are in fluid communication with the interior volume 40 of the cell 12 by conduits 30 and 36 which are sealingly engaged through the end stoppers 16 and 18 and valve controlled at 28 and 34, respectively.

The system 10 further includes an electrode 20 mounted within the interior volume, this electrode 20 is preferably formed of a strip of pure palladium (Pd) material but may also be formed of titanium (Ti) or zirconium (Zr). The width, length and thickness of this electrode 20 is 5.0 cm long by 0.007" thick and 1.20 cm wide so as to fit into a PYREX glass tube having an I.D. of 1.3 cm.

The electrode 20 extends to define end portions thereof which form confinement zones 22 and 24. These confinement zones 22 and 24 are partially formed by non-conductive polyester resin encapsulations at 36 and 38. To further define each of these confinement zones 22 and 24, a thin layer of electroplated gold (Au) is formed thereon. A source of low d.c. voltage, preferably a 9-volt d.c. battery cell is connected by conductive wires at 42 and 44 sealingly engaged through the corresponding stoppers 16 and 18 to the corresponding confinement zones 22 and 24, respectively.

Figure 3:
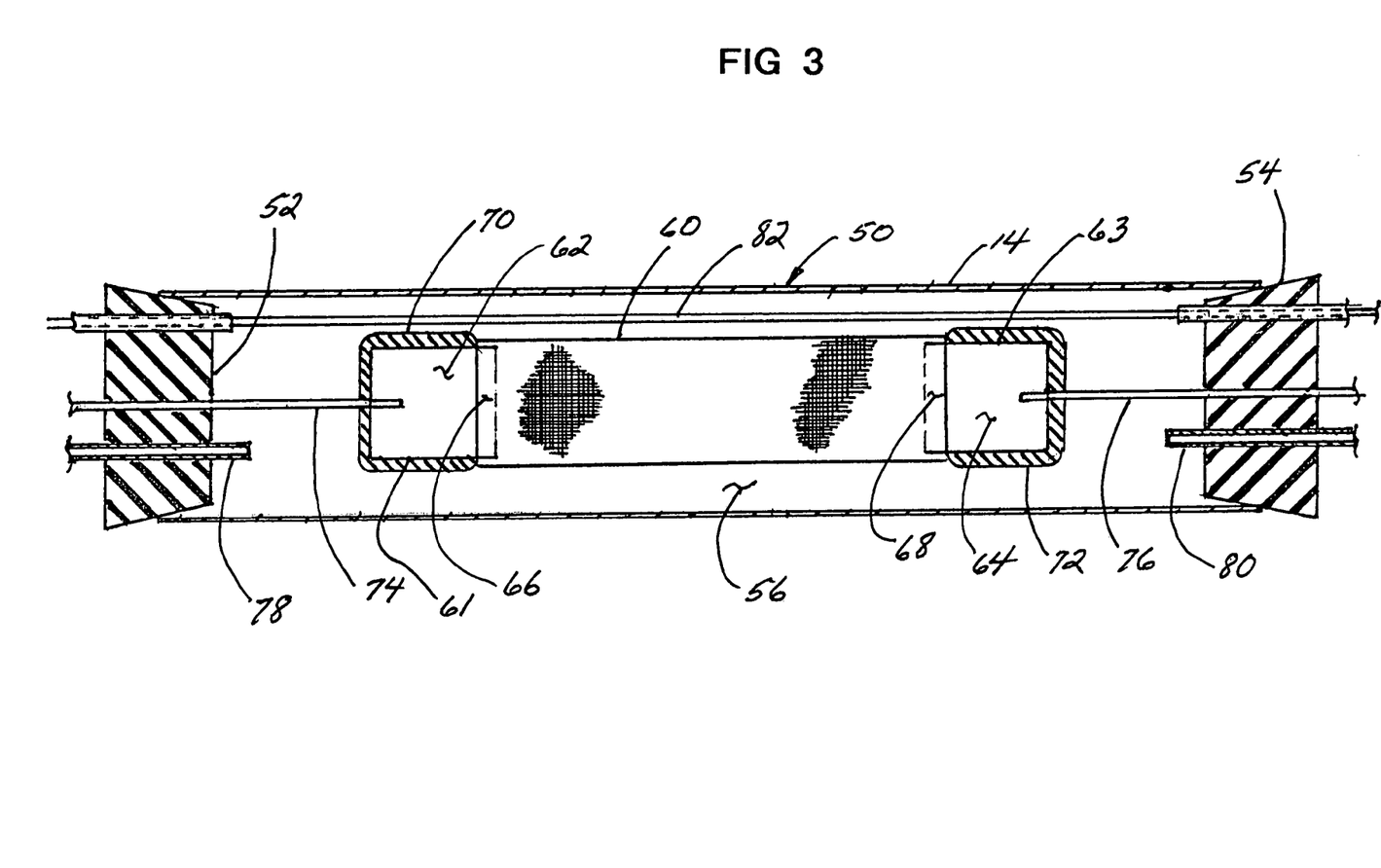
FIG. 3 is a section view of another and preferred embodiment of the catalytic cell.
Figure 4:
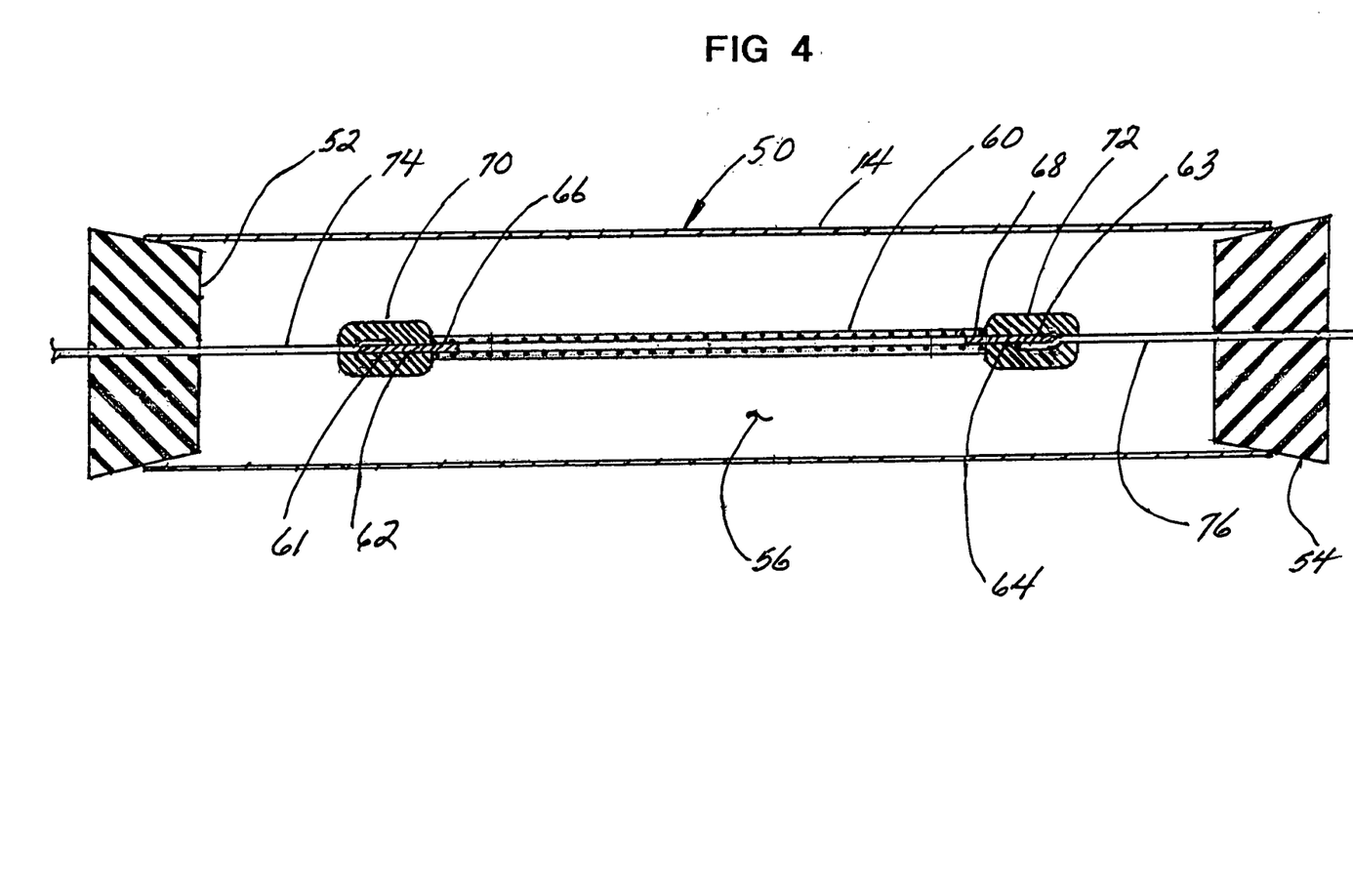
FIG. 4 is a side elevation section view of FIG. 3.

Referring now to FIGS. 3 and 4, another and preferred embodiment of the catalytic cell is there shown generally at numeral 50. This cell 50 includes the tubular non-conductive glass housing 14 previously described with rubber stoppers 52 and 54 sealingly engaged into each end thereof. The catalytic electrode 60 is, in this embodiment 50, formed of a screen mesh material preferably formed of nickel screen with a thin palladium plating formed thereover. The material used to form this electrode 60 is described as nickel mesh available from Alfa Aesar having a mesh size of 40 and a wire size of 1.3 mm (0.005").

Solder connected at 66 and 68 to each end portion of the electrode 60 are gold electroplated palladium strips 61 and 63 which are encapsulated by a cured polyester resin material at 70 and 72 to complete each of these confinement zone areas 62 and 64. Conductive wires 74 and 76 extend sealingly through each of the rubber stoppers 52 and 54 to be solder connected to the confinement zone areas 62 and 64. Inlet and outlet tubes 78 and 80, sealingly connected to the gas chambers 26 and 32 of FIG. 1, are also sealingly engaged through the end stoppers 52 and 54.

Figure 5:
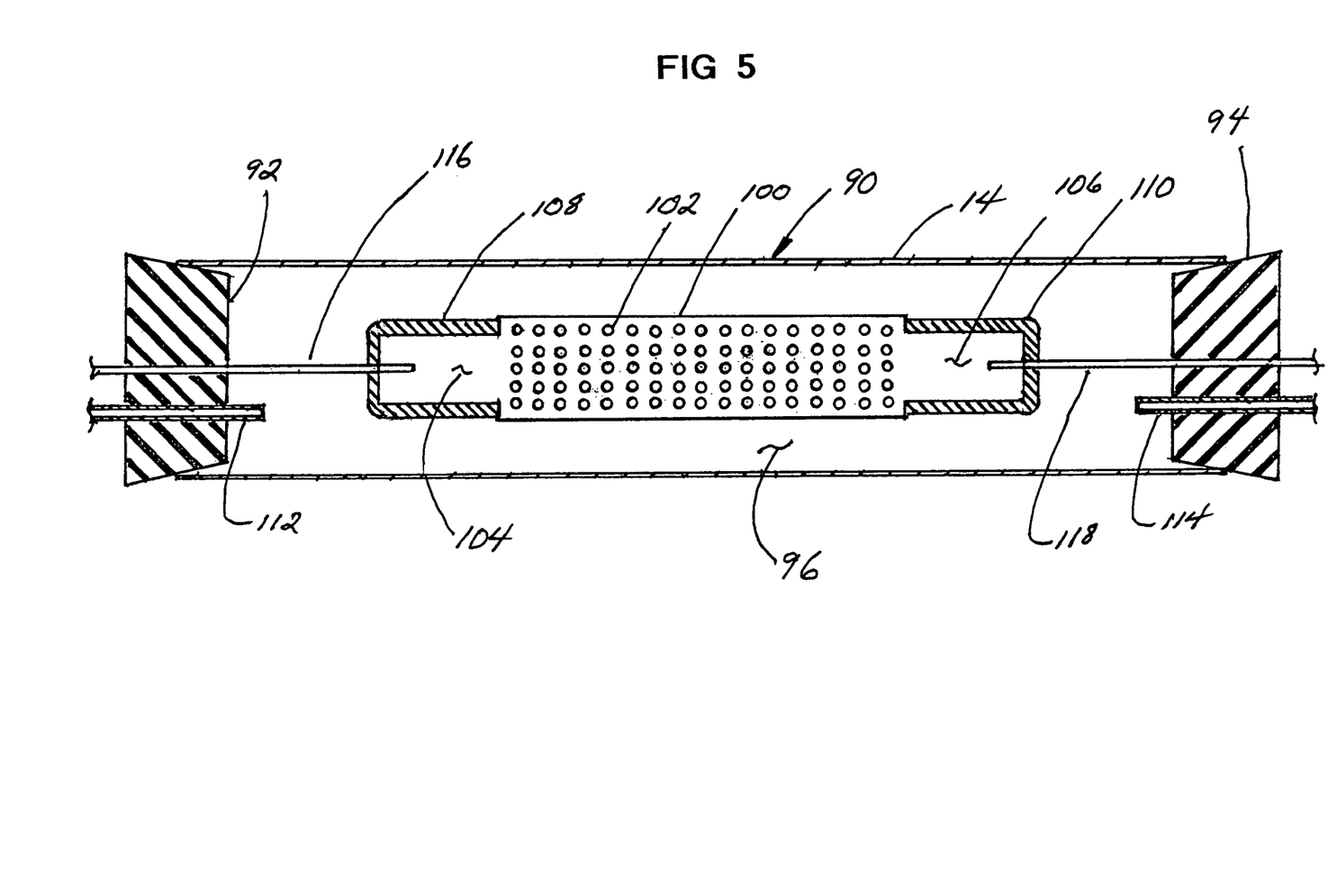
FIG. 5 is a section view of still another embodiment of the catalytic cell and electrode positioned therein.

Referring to FIG. 5, yet another embodiment of the invention is there shown generally at numeral 90 and also includes a tubular non-conductive Pyrex glass housing 14 having non-conductive rubber stoppers 92 and 94 sealingly engaged at each end thereof to define a sealed interior volume 96. The electrode 100 is formed of a strip of palladium (Pd) material as previously described with respect to FIG. 2 except for the addition of a series of perforations or holes 102 which appear to enhance loading of the electrode 100 as will be described more completely herebelow.

Each of the end confinement zones 104 and 106 as extensions of the electrode 100, are encapsulated by polyester resin at 108 and 110, conductive wires 116 and 118 are soldered or braised onto the confinement zones 104 and 106 and extend sealingly out through stoppers 92 and 94 to be connected to a source of d.c. voltage as previously described. Inlet and outlet tubes 112 and 114 are also sealingly engaged through the stoppers 92 and 94 for connection to the gas chambers of FIG. 1.

Figure 6:
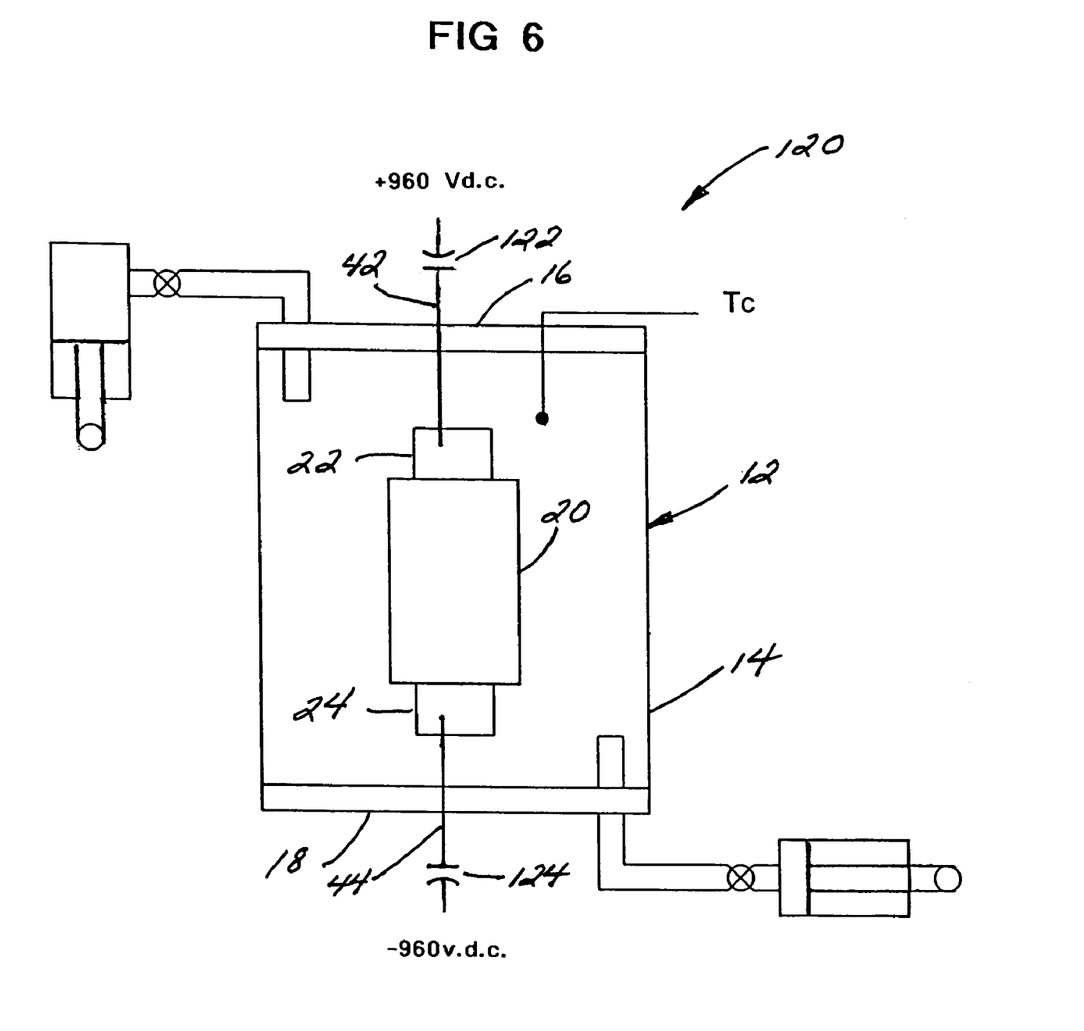
FIG. 6 is a simplified schematic view of an alternate embodiment of the system similar to that of FIG. 1.

Referring lastly to FIG. 6, an alternate system of the invention is there shown generally at numeral 120 and is similar to FIG. 1 previously described and includes a catalytic cell 12 having an elongated tubular non-conductive housing 14 formed preferably of PYREX glass and non-conductive stoppers 16 and 18 sealably engaged into each end of the housing 14. The electrode 20 includes the confinement zones 22 and 24 as previously described, each of which have a conductive wire 42 and 44, respectively, extending in sealed fashion outwardly from stoppers 16 and 18, respectively.

This embodiment 120 further includes ceramic capacitors 122 and 124 positioned between a high d.c. voltage source in the range of up to 1000 v.d.c., each of these capacitors 122 and 124 having a capacitor rating of 0.1 μF. By this arrangement, a high voltage and zero current are imposed upon the electrode 20 and the corresponding confinement zones 22 and 24 so as to substantially accelerate the deuteride and/or hydride ion charging process. Table II below dramatizes the dramatic effect that the higher d.c. voltage has upon the time required to charge the electrode.

TABLE II

| Voltage (d.c.) | $D_2$ Uptake Rate ml. per hr. | $\Delta T$ |
|---|---|---|
| 50 v. | 1.0 | nil |
| 150 v. | 3.0 | nil |
| 300 v. | 6.0 | nil |
| 960 v. | 24.0 | nil |

Vacuum Test

With this assembly, remove syringe and replace it with a vacuum pump. Open the three-way valve with the other 3-way valve closed. Apply 30" Hg vacuum. Close 3-way valve and determine the system holding of 30" Hg vacuum. It should hold for 3.0 hours. This vacuum test is to insure that outside air cannot contaminate the isotope gas. As described below, during electrode loading as $H_2$ or $D_2$, gas is drawn from the first syringe. A vacuum is created in the cell, causing the syringe to feed more gas. During this vacuum, the system cannot leak outside air as this would destroy gas usage data.

As the loading progresses, the Tc (cell temp) is compared to the ambient Ta. The uptake of gas to a 1:1 atomic ratio is computed by the dimensions of the electrode free space.

$$L \times W \times T \times \text{Density} \frac{[g/cm]}{[M.Wt.]} = \text{Wt Pd(Vol of free electrode space Pd}$$

$$\text{Mole} \times 22.4 \text{ L} = \text{Vol. of gas } D_2 \div 2 \text{ to give 2 Pd D}$$

The gas is loaded into electrode (Pd) free space to the point of Pd $D_{0.6}$. Then the battery connected creating a ± charged zone A until Pd D$^-$ and Pd D$^+$ the D$^-$ and D$^+$ ionic deuterium migrates to the confined zones A$^+$ and A$^-$.

This charge loading of $D^2$ continues until a positive differential of Tc (thermocouple) is observed.

Operation

Hydrogen Isotope (Gas) Confinement

Cell showing $D_2$-$H_2$ gas uptake from syringe reservoir. The gas uptake is on demand by the reaction of The Zwitter ion D$^+$ & D$^1$ are formed on the Palladium (Pd) metal matrix. The cell is quality control tested with the retention of 30" Hg vacuum for 24 hours to insure an accurate gas uptake.

Cell Design

Free Pd vol.=0082 cm$^3$. Confinement vol=0.11 cm$^3$. 100. cc of $D_2$ gas. Loading the confinement zone Pd (12.3 cc $D_2$) will be by ±9 Vd.c. The 9 v.d.c. battery is thru a 100 ohms (Ω) resistor outside of the cell.

TABLE III $H_2$ & $D_2$ Gas Loading

| Time (days) | $D_2$ Uptake (c.c.) | Gas Available (c.c.) | ΔT (° C.) |
|---|---|---|---|
| Start | 0.0 | 52.5 | |
| 1 | 6.0 | 46.5 | 0° |
| 1 | 7.5 | 45.0 | 0° |
| 1 | 11.5 | 40. | 0° |
| 2 | 17.5 | 34. | 0.1° |
| 3 | 21.5 | 30. | 0.1° |
| 4 | 36.5 | 15. | 0.5° |
| Recharge Syringe | | 60. | 2.6° |
| 5. | 43.5 | 53. | 0.5° |
| 6 | 48.5 | 48. | 0.6° |
| 6 | 58 | | 0.7° |
| 7 | 64 | 42. | 0.6° |
| 8 | 69 | 37. | 0.2° |
| 9 | 74 | 32. | 0.2° |
| 10 | 78 | 28. | 0.0° |
| 11 | 80 | 26. | 0.0° |
| Recharge Syringe | | 59. | |
| 12 | 83 | 56. | 0.3° |
| 13 | 88 | 51. | 0.4° |
| 14 | 91 | 48. | 0.3° |
| 15 | 94 | 45. | 0.4° |
| 18 | 106 | 32. | 0.3° |
| 19 | 109 | 29. | 0.5° |
| 20 | 110 | 28 | 0.5° |
| 21 | 112 | 26 | |
| Change to $H_2$ | | 50 (no battery) | |
| 22 | 7 + 112 = 119 | 43 | 0.3° |
| 23 | 16.5 + 112 = 128.5 | 32.5 | 0.5° |
| 24 | 17.5 + 112 = 129.5 | 32 | 0.6° |
| | | | 0.7° |
| | | | 1.0° |
| 25 | 23.5 + 112 = 135.5 | 26 | 1.10° |

$D_2$ is twice vol. of $H_2$; therefore, a gas volume uptake of 112 cc $D_2$ is about equivalent to a $H_2$ of 224 cc. The previous prior art $H_2$ loading limit of known catalysts is about 100 cc. The present invention displays a $D_2$ and $H_2$ gas uptake increase of about 125%.

Three embodiments of the electrodes have been described hereinabove. Experimental results indicate that all three embodiments are generally characterized as being capable of absorbing and storing approximately the same volume of hydrogen and deuterium and gas. However, the flat uninterrupted continuous electrode described in FIGS. 1 and 2 requires a gas loading time period as set forth in Table III hereinabove of approximately 30 to 35 days to fully charge. The screen mesh electrode embodiment of FIGS. 3 and 4 has surprisingly demonstrated a charging or loading rate of only two (2) days to be fully absorbed of hydrogen and/or deuterium gas. The perforated electrode of FIG. 5 has demonstrated a gas-loading rate of approximately eight (8) days to fully charge and absorb hydrogen and/or deuterium gas to its maximum. In each case, the gas absorbed is converted to a solid state in the ionic form at the confinement zones at each end of the electrode during the absorption process as previously described.

Once each of the electrodes has been fully charged, it may be removed and stored for further use as a catalytic element. However, less ion leakage has been found to occur if the electrode is left sealed within the housing. During sealed storage, a low vacuum pressure occurs which may enhance storage.

While the instant invention has been shown and described herein in what are conceived to be the most practical and preferred embodiments, it is recognized that departures may be made there from within the scope of the invention, which is therefore not to be limited to the details disclosed herein, but is to be afforded the full scope of the claims so as to embrace any and all equivalent apparatus and articles.

The invention claimed is:

1. A catalytic cell for absorbing and storing hydrogen ($H_2$) and deuterium ($D_2$) in the gaseous form, comprising:
   a non-conductive housing defining a sealable interior volume;
   a conductive catalytic electrode positioned within said housing and said interior volume and being capable of absorbing and retaining $H_2$ and/or $D_2$ gas and being formed of palladium (Pd), titanium (Ti), or zirconium (Zr);
   each end portion of said electrode being plated with a layer of gold and encapsulated with a curable resin to form a confinement zone thereof;
   each said end portion being connectable to an external d.c. electric power source;
   said interior volume sealingly connectable to first and second gas chambers positioned externally of said housing and cooperatively acting to introduce $H_2$ and/or $D_2$ gas into said interior volume for absorption thereof by said electrode.

2. The catalytic cell of claim 1, wherein:
   said electrode is formed as a continuous, uninterrupted strip.

3. The catalytic cell of claim 1, wherein:
   said electrode is perforated.

4. The catalytic cell of claim 1, wherein:
   said electrode is formed of nickel screen mesh coated with Pd, Ti or Zr.

5. A catalytic electrode for absorbing and storing hydrogen ($H_2$) and deuterium ($D_2$) in the gaseous form, comprising:
   a conductive catalytic electrode capable of absorbing and retaining $H_2$ and/or $D_2$ gas and being formed of palladium (Pd), titanium (Ti), or zirconium (Zr);
   each end portion of said electrode being plated with a layer of gold and encapsulated with a curable resin to form a confinement zone thereof.

6. The catalytic electrode of claim 5, wherein:
   said electrode is formed as a continuous, uninterrupted strip.

7. The catalytic electrode of claim 5, wherein:
   said electrode is perforated.

8. The catalytic electrode of claim 5, wherein:
   said electrode is formed of nickel screen mesh coated with Pd, Ti or Zr.

9. A catalytic system for absorbing and storing hydrogen ($H_2$) and deuterium ($D_2$) in the gaseous form, comprising:
   a non-conductive housing defining a sealed interior volume;
   a conductive catalytic electrode positioned centrally within said interior volume and being capable of absorbing and retaining $H_2$ and/or $D_2$ gas and being formed of palladium (Pd), titanium (Ti), or zirconium (Zr);

each end portion of said electrode being plated with a layer of gold and encapsulated with a curable resin to form a confinement zone thereof;

each said end portion being connected to an external d.c. electric power source;

said interior volume in sealed fluid communication with a first and a second gas chamber positioned externally of said housing and cooperatively acting to introduce $H_2$ and/or $D_2$ gas into said interior volume for absorption thereof by said electrode.

10. The catalytic system of claim 9, wherein:
said electrode is formed as a continuous, uninterrupted strip.

11. The catalytic system of claim 9, wherein:
said electrode is perforated.

12. The catalytic system of claim 9, wherein:
said electrode is formed of nickel screen mesh coated with Pd, Ti or Zr.

13. The catalytic system of claim 9, further comprising:
a capacitor positioned between each said end portion and said power source wherein substantially no electric current passes through said electrode.

14. A process for absorbing and storing hydrogen ($H_2$) and deuterium ($D_2$) in the gaseous form, comprising the steps of:

providing a non-conductive housing defining a sealed interior volume;

positioning a conductive catalytic electrode within said housing and said interior volume, said electrode being capable of absorbing and retaining $H_2$ and/or $D_2$ gas and being formed of palladium (Pd), titanium (Ti), or zirconium (Zr);

each end portion of said electrode being plated with a layer of gold and encapsulated with a curable resin to form a confinement zone thereof;

introducing $H_2$ and/or $D_2$ gas into said interior volume for absorption thereof by said electrode;

maintaining an external d.c. electric power source connected to each of said confinement zones until said electrode has been substantially loaded with $H_2$ and/or $D_2$;

terminating flow of said gas into said interior volume and disconnecting said power source.

15. The process of claim 14, wherein:
said electrode is formed as a continuous, uninterrupted strip.

16. The process of claim 14, wherein:
said electrode is perforated.

17. The process of claim 14, wherein:
said electrode is formed of nickel screen mesh coated with Pd, Ti or Zr.

18. The process of claim 14, wherein:
said power source is connected to each of said confinement zones through a capacitor.

* * * * *